Oct. 26, 1937.  B. CANDLISH  2,097,206
INTERNAL COMBUSTION ENGINE
Filed Aug. 27, 1936
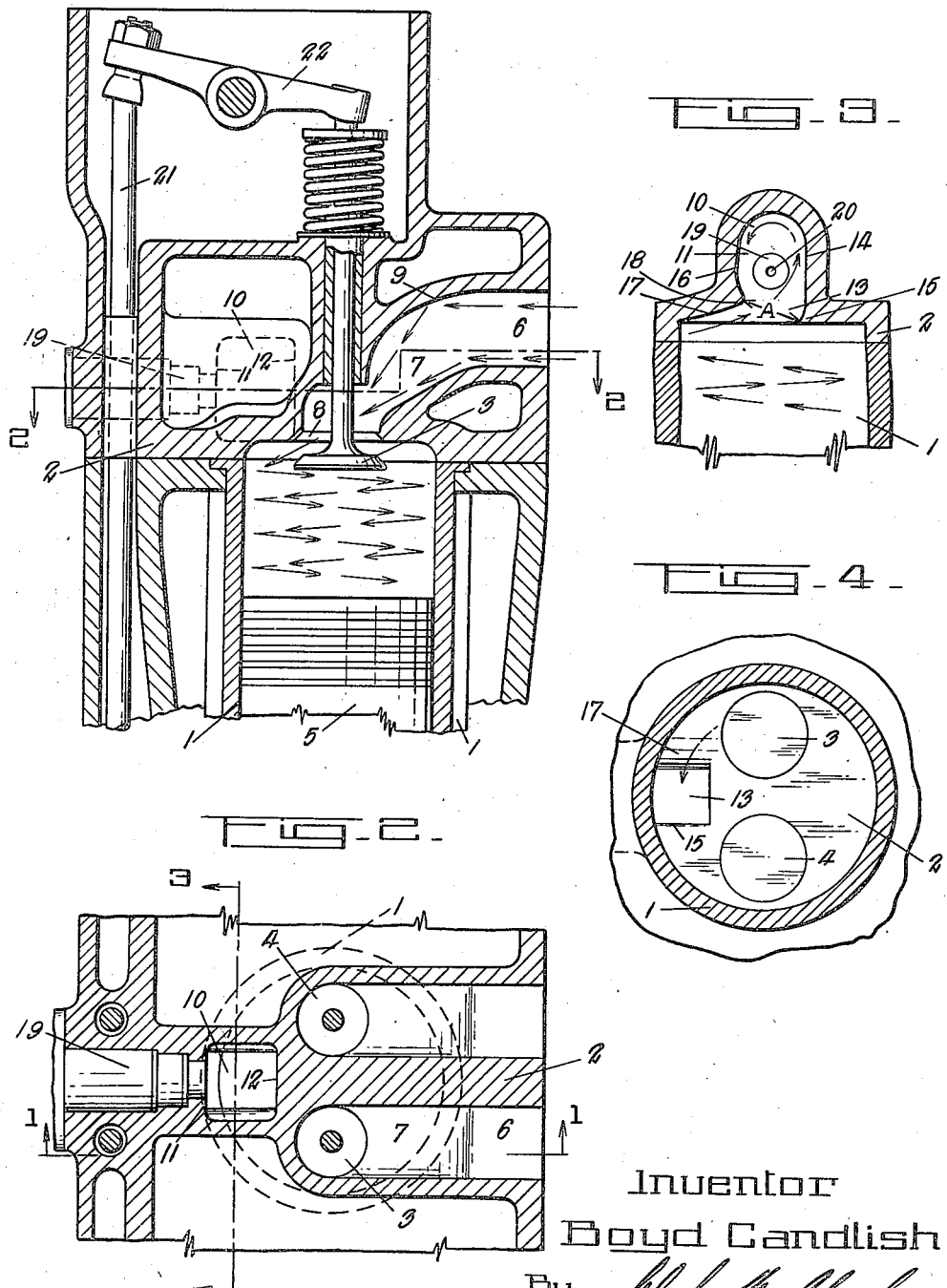
Inventor
Boyd Candlish
By
Atty.

Patented Oct. 26, 1937

2,097,206

UNITED STATES PATENT OFFICE 2,097,206

INTERNAL COMBUSTION ENGINE

Boyd Candlish, Sandwich, Ontario, Canada

Application August 27, 1936, Serial No. 98,124

7 Claims. (Cl. 123—30)

My invention relates to improvements in internal combustion engines and while it is more particularly directed to engines burning heavy fuel oil, such as the Diesel type, its principle is applicable to any engine burning air and liquid fuel in vapour form.

The object of my invention is to provide an engine wherein the air inlet passage in the cylinder head is so designed that the inducted air passes into the cylinder in a downwardly inclined substantially tangential direction, whereby the air stream upon passing into the cylinder acquires and follows a downwardly directed spiral movement following the piston to the bottom of its stroke and wherein such inducted air continues to rotate within the cylinder as the piston moves upwardly during the compression stroke, the speed of rotation of the air within the cylinder being proportional to the rapidity of movement of the engine piston.

A further and particular object of my invention is to provide a pre-combustion chamber mounted upon and opening into the cylinder head for the reception of the compressed air, and wherein the air flow swirled upwardly by the upward movement of the piston sweeps into and around the chamber in a continuing uni-directional flow, though at a greatly increased velocity. The chamber is substantially cylindroidal in form and provided with flat ends, through one of which ends the combustion fuel is sprayed directly across the air flow. By this arrangement the velocity of the air stream in the precombustion chamber is always proportional to the rotative speed of the engine, and as the mixture of the injected fuel with the air in the pre-combustion chamber is always relative to the speed of the engine, my construction provides an automatic variable ignition period which adjusts itself in relation to the engine speed, thus avoiding the necessity of varying the injection timing by mechanical means.

A further and particular object of my invention is to so design the volume of the pre-combustion chamber that it contains from 80% to 85% of the total compressed air when the piston is at the top of its stroke, the other 15% to 20% of the compressed air being in the clearance portion of the cylinder head above the piston and used to provide the necessary oxygen to completely consume any fuel particles which are not burned in the pre-combustion chamber, whereby complete combustion producing a clear and odourless exhaust, is obtained.

My invention further embraces certain proportional dimensional relations between the air inlet arrangement, cylinder bore and pre-combustion chamber all as shall be hereinafter more particularly described, and illustrated in the accompanying drawing, in which:

Fig. 1 is a vertical cross-sectional view through the upper portion of an engine cylinder constructed according to my invention, such section being taken through the line 1—1, Fig. 2.

Fig. 2 is a horizontal cross-sectional view through the cylinder head, being taken through the line 2—2, Fig. 1.

Fig. 3 is a vertical cross-sectional view through the pre-combustion chamber, being taken through the line 3—3, Fig. 2, and Fig. 4 is an inverted cross-sectional view through the cylinder, and showing the top of the cylinder and the throat in the top which opens into the pre-combustion chamber.

Like characters of reference indicate corresponding parts in the different views in the drawing.

As my invention is more particularly concerned with air compressing engines of the Diesel type, my drawing illustrates a Diesel engine cylinder 1 having a head 2 provided with inlet and exhaust valves 3 and 4. The inlet valve being shown as actuated by a push rod 21 and rocker arm 22.

As is common knowledge to those skilled in the art, air is inducted into the cylinder through the open inlet valve 3 during the induction stroke of the piston 5, and as the piston commences its upward or compression stroke, the inlet valve 3 closes and the inducted air is compressed to a pressure of some 500 lbs. and reaches a resultant temperature of approximately 1000° F. When the air approaches this pressure and temperature, fuel oil is injected into the combustion chamber and upon diffusing with the compressed air at this high temperature the mixture of air and oil immediately ignites and the combustion expansion drives the piston downwardly through the working stroke. It has been generally admitted that most Diesel engines consume less than half of the air in the cylinder due to the air being trapped in parts of the cylinder head and lost to combustion and therefore that the performance of the Diesel engine can be considerably improved through the creation of better cylinder turbulences, particularly if such turbulences can be made to follow a definite path past the fuel injection nozzle.

In my engine, air is conducted to the inlet valve 3 through an induction passage formed in the cylinder head entirely above the top of the cylinder. This passage comprises two portions, an air entrance portion 6 which is substantially horizontal and a second portion 7 which is an unobstructed continuance of the portion 6 and inclined downwardly to communicate with and surround the inlet valve port or seating 8. I have found through calculation and experiment that the passage portion 7 can be designed at an inclination which may be varied between 15° and 30° to the horizontal, the inclination being made to suit any definite cylinder bore or particular engine design. The air inlet passage can be of any suitable cross-sectional shape such as substantially circular or oval and the head is so designed that there is no constriction of the air flow in its passage to the inlet valve. In Fig. 1 arrows are shown to indicate the flow of air through the induction passage, and it will be seen that the air stream has an unobstructed downwardly inclined flow to the inlet valve opening. The upper portion of the air flow in passing along the curved upper portion 9 of the passage is deflected downwardly into the main air stream as indicated by the upper arrows.

My pre-combustion chamber 10 is arranged in the cylinder head, and, as shown in the drawing, is an integral part of the casting, though it will be understood that it can be bolted on as a separate unit. The chamber may be described as of substantially cylindroidal form, that is with its end faces 11 and 12 flat and partly oval in shape. The horizontal axis of the chamber is radially disposed in relation to the cylinder, and the chamber side wall 11 may be either set back from the upper end of the cylinder wall as illustrated in Fig. 2, or substantially merging into the cylinder wall if so desired.

The lower portion of the pre-combustion chamber 10 opens into the top of the cylinder through a throat 13, having the major portion of its area contained within the compass of the cylinder wall, and this throat is so designed that the compressed air from the cylinder has an unobstructed sweep into the chamber. In my design as shown in Fig. 3, one side 14 of the pre-combustion chamber is somewhat flat in its central portion and in its lower portion curves inwardly to form a slight lip 15 along one side of the throat. The other side 16 of the chamber along which the air flows, as indicated by the arrows in this figure, is relieved by a tangentially positioned face 17 curving upwardly from the cylinder top to a slight round cornered lip 18 which merges into the side of the chamber 10. The upward movement of the piston 5 drives the rotating air flow in the cylinder through the throat in a sweeping movement into the pre-combustion chamber 10 where the air is maintained in its uni-directional flow though at a greatly increased velocity. The fuel injection nozzle 19 is placed in horizontal relation to the combustion chamber and opens thereinto below the central portion of the chamber end 11 so that fuel is sprayed from the nozzle opening 20 directly across the lower end of the uni-directional air stream passing around the pre-combustion chamber.

Upon reference to Fig. 4, it will be observed that the orifice of the inlet valve 3 is positioned in proximity to the periphery of the cylinder and therefore the air upon passing through the valve opening from the tangentially directed passage 7, is immediately guided by the cylinder wall into a spiral flow following the downward movement of the piston. It will be also seen upon reference to Fig. 4 that the throat 13 opening from the cylinder into the combustion chamber is also positioned in proximity to the cylinder wall so that as the piston 5 moves upwardly on the compression stroke the upwardly swirling air sweeps into the pre-combustion chamber across the curved face 17 without encountering any obstruction or breaking down of its uni-directional flow. As the velocity of the air stream in the pre-combustion chamber is always proportional to the rotative speed of my engine, my design provides an automatic variable ignition period which adjusts itself to the engine speed. As the pre-combustion chamber is connected to the cylinder by a short throat of ample area, a minimum of heat is absorbed by the metal both before and after combustion whereby maximum thermal efficiency is obtained.

In designing my engine I have found that highest efficiency is produced by maintaining a proportionate relationship between the inlet valve diameter, the piston displacement and engine speed. I set forth this relationship as follows and as there is no specific point at which performance can be definitely fixed as at the maximum, I set my formula down to include two limits of best performance.

$$d = \text{From} \sqrt{\frac{S \times R.P.M. \times D^2}{47000}} \text{ To } \sqrt{\frac{S \times R.P.M. \times D^2}{65500}}$$

wherein:
$d$ = diameter inlet valve in inches
$D$ = diameter of piston in inches
R. P. M. = rotating speed of engine at normal rating
$S$ = stroke of piston in inches To provide the highest efficiency in the relationship between the inlet valve and the pre-combustion chamber, the area of the throat 13 as indicated by the letter A in Fig. 3 shall be as follows:

$$A = .098 D^2$$

wherein:
A = area of throat in square inches
D = diameter of piston in inches

From the foregoing description of my invention it will be apparent that I have designed an engine which is particularly suited for automotive work as complete combustion can be obtained under variable loads, speeds and other requirements, and by the even burning of the fuel an adequate torque is obtained. While my invention is shown and described as pertaining to a Diesel engine it is to be understood that my design is susceptible, with slight changes or modifications, to being incorporated in any of the group of surface ignition engines, that is engines compressing air and burning distilled oils and heavier kerosenes by the assistance of hot-bulbs, tubes, etc., and also that while I have shown and described my invention as applied to a four-stroke engine that my tangential induction of air in combination with my pre-combustion chamber, can, with certain modifications, be with equal facility used in a two-cycle design.

What I claim as my invention is:

1. In an internal combustion engine, a cylinder, a piston reciprocable therein, an air inlet port opening into the cylinder head in the vicinity of and within the compass of the cylinder wall, a substantially tangentially directed air induction passage communicating with the port, a substantially cylindroidal shaped compressed air receiving chamber situated above the cylinder and having its axis horizontal and substantially radially disposed in relation to the cylinder, a throat opening upwardly from the cylinder to the chamber, and two side faces formed in the throat and positioned upon either side of and in parallel relation to a diameter line of the cylinder which is parallel to the horizontal axis of the compressed air receiving chamber, said side faces being curved in the same direction from the lower portions of the side walls of the cylindroidal chamber into the top of the engine cylinder and diverging in relation to one another.

2. In an internal combustion engine, a cylinder, a piston reciprocable therein, an air induction passage opening into the cylinder in a direction substantially tangential to the axis of the cylinder whereby inducted air enters the cylinder from the passage in a tangential spiral forming flow, a compressed air receiving pre-combustion chamber situated at the top of the cylinder, a throat opening from the cylinder into the chamber, two substantially straight side faces forming part of the walls of the throat and positioned substantially parallel to a diameter line of the cylinder passing mid-way between such faces, one of the parallel side faces sweeping upwardly from the cylinder at an inclination substantially corresponding to the inclination of the spiral air flow, and a slight lip formed on the other side face and protruding towards the bottom of the upwardly sweeping side face.

3. In an internal combustion engine, a cylinder, a piston reciprocable therein, an air inlet port opening into the cylinder head in the vicinity of and within the compass of the cylinder wall, a substantially tangentially directed air induction passage communicating with the port, a substantially cylindroidal shaped compressed air receiving chamber situated above the cylinder and having its axis horizontal and lying along the same vertical plane as a diameter line of the cylinder which is in turn substantially parallel to the air induction passage, a fuel injection nozzle positioned in the end of the chamber outermost from the center of the engine cylinder, and a throat opening upwardly from the cylinder to the chamber and having the major portion of its area contained within the compass of the cylinder wall.

4. In an internal combustion engine, a cylinder, a piston reciprocable therein, an air inlet port opening into the cylinder head in the vicinity of and within the compass of the cylinder wall, a substantially tangentially directed downwardly inclined air induction passage communicating with the port, a substantially flat ended cylindroidal shaped compressed air receiving chamber situated above the cylinder and having its axis horizontal and lying along the same vertical plane as a diameter line of the cylinder which is in turn substantially parallel to the air induction passage, a fuel injection nozzle positioned centrally of the width of the flat end of the chamber outermost from the center of the engine cylinder, and a throat opening upwardly from the cylinder to the chamber and having the major portion of its area contained within the compass of the cylinder wall.

5. In an internal combustion engine, a cylinder, a piston reciprocable therein, an air inlet valve port communicating with the cylinder, a substantially cylindroidal shaped compressed air receiving chamber situated above the cylinder and having its axis horizontal and substantially radially disposed in relation to the cylinder, a substantially flat face forming the end of the chamber outermost from the center of the engine cylinder, a fuel injection nozzle positioned centrally of the width and in the lower portion of said flat end face of the chamber, and a throat opening from the cylinder to the chamber.

6. In an internal combustion engine, a cylinder, a piston reciprocable therein, an air inlet port opening into the cylinder head in the vicinity of the cylinder wall, a substantially tangentially directed downwardly inclined air induction passage communicating with the port, a substantially flat ended cylindroidal shaped compressed air receiving chamber situated above the cylinder and having its axis horizontal and lying along the same vertical plane as a diameter line of the cylinder which is in turn substantially parallel to the air induction passage, a substantially flat face forming the end of the chamber outermost from the center of the engine cylinder, a fuel injection nozzle positioned centrally of the width and in the lower portion of said flat end face of the chamber, a throat opening from the cylinder into the chamber in the vicinity of the wall of the cylinder, and a face positioned substantially parallel to the horizontal axis of the compressed air receiving chamber and extending to and forming part of said throat and inclined upwardly from the cylinder towards the chamber.

7. In an internal combustion engine, a cylinder, a piston reciprocable therein, an air inlet port opening into the upper end of the cylinder, an air induction passage inclined downwardly to the port in a direction substantially tangential to the axis of the cylinder whereby inducted air passes downwardly into the cylinder in a tangential spiral forming flow, a compressed air receiving combustion chamber situated at the top of the cylinder, a throat opening from the top of the cylinder into the chamber in the vicinity of the wall of the cylinder, and a curved face forming a wall of the throat, said face being positioned substantially parallel to a diameter line of the cylinder which is in turn parallel to the air induction passage and sweeping upwardly from the cylinder in a direction substantially tangential to the axis of the cylinder and at an inclination substantially corresponding to the inclination of the spiral air flow.

BOYD CANDLISH.